March 24, 1953     D. B. VAN DOLAH     2,632,201
POULTRY SHACKLE
Filed April 12, 1950

INVENTOR.
Delos B. Van Dolah
BY
R.G. Story
ATTORNEY

Patented Mar. 24, 1953

2,632,201

UNITED STATES PATENT OFFICE 2,632,201

POULTRY SHACKLE

Delos B. Van Dolah, Chicago, Ill., assignor to Swift & Company, Chicago, Ill., a corporation of Illinois Application April 12, 1950, Serial No. 155,379

3 Claims. (Cl. 17—44.1)

This invention relates to a poultry shackle and, more particularly, to a shackle for suspending poultry by the legs on a conveyor line in a continuous poultry dressing operation.

The invention specifically is an improvement upon the shackle shown in the DeVout Patent 2,035,948.

In modern poultry plants it is customary to suspend the poultry by shackles from a conveyor whereby the poultry is conveyed past stations wherein the poultry is bled, scalded, picked, singed, etc. In the picking operation it is customary in recent years to use automatic mechanical pickers. Such pickers usually comprise two parallel rotatable drums containing rubber fingers. As the scalded poultry is conveyed between these drums the fingers envelop the body of the poultry and remove the feathers.

In picking poultry with automatic picking machines difficulty has been encountered in removing the feathers from the lower part of the legs, frequently referred to as "garter" feathers. The principal reason for the difficulty in removing the garter feathers was because such feathers were so close to the shackle that they could not be reached by the rubber fingers without the fingers beating on the shackle and being damaged.

The type of shackle which is used quite generally in the poultry industry is the DeVout shackle shown in the aforesaid patent. One of the reasons that the garter feathers are so close to the shackle is due to the construction of the shackle. For example, in the DeVout shackle the recess into which the legs of the poultry are inserted extends lengthwise of the sides of the shackle. The length of the legs of the poultry extending below the shackle is decreased in the amount proportionately to the length of the recess. Furthermore, when the legs of the poultry are fitted into the recesses a foot is positioned on one side of the shackle while the principal part of the leg is on the opposite side of the shackle. Accordingly, since the recesses are vertical, the legs extend at an angle from the vertical and this angle further decreases the length of the leg below the shackle in proportion to the degree in which the angle deviates from the vertical.

In accordance with the present invention an improved shackle has been provided whereby the poultry is suspended from the shackle so that the legs extend substantially in a vertical direction below the shackle. Also, substantially all the leg below the foot is freely exposed. In such a shackle the garter feathers are a substantially greater distance from the shackle than in the old type shackle and substantially all of the garter feathers can be removed with an automatic picking machine.

The invention will be more clearly understood from the following description read in connection with the accompanying drawing, in which.

Figure 1:
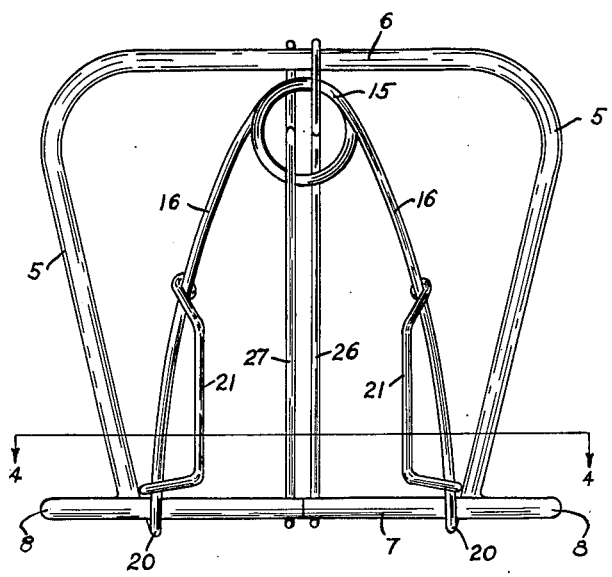
Fig. 1 is a front view of the shackle.
Figure 2:
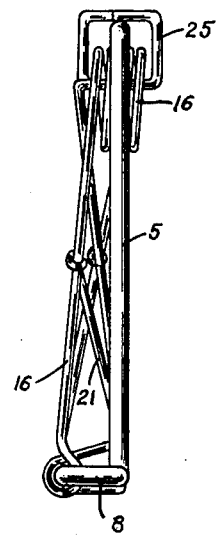
Fig. 2 is a side view of the shackle shown in Fig. 1.
Figure 3:
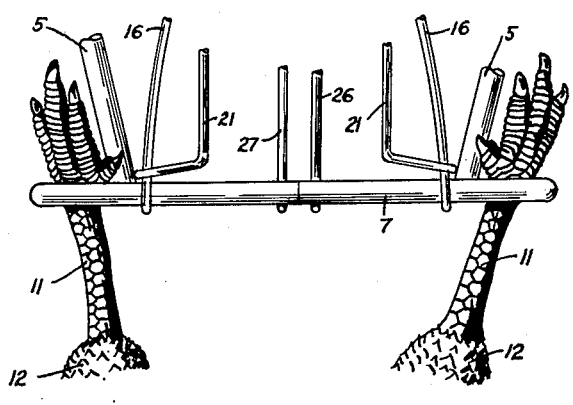
Fig. 3 is a front view of the lower section of the shackle showing a chicken suspended by the feet therefrom.

The shackle shown in the drawing is ordinarily suspended from an overhead conveyor by means of a hook or other suitable hanger (not shown) which is attached to the upper portion of the shackle so that the shackle will hang in a vertical position as shown in Fig. 1. The poultry is suspended by the feet from the lower portion of the shackle, as shown in Fig. 3, whereby the shackle and the suspended poultry may be conveyed along a poultry line and subjected to the various dressing operations.

The shackle comprises a frame composed of side members 5 connecting a top member 6 and a bottom member 7. The frame may be made of any suitable material and, as shown in the drawing, is a wire or rod bent to the desired shape. The shape of the shackle may vary but it is preferably open in the middle for holding a spring member referred to hereinafter. As shown in the drawing, the shackle is bowed out at the top and the sides are tapered inwardly toward the bottom.

Figure 4:
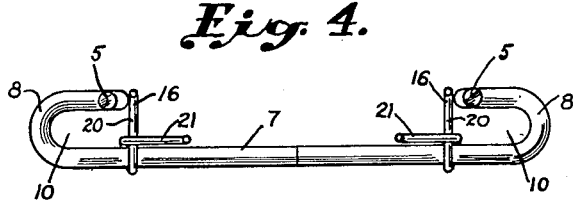
Fig. 4 is a view along line 4—4 of Fig. 1 with the brace means omitted.

The bottom member extends forwardly of the sides 5 in a horizontal plane. Also, the bottom member has reversely-extending end portions 8 which extend beyond the sides 5 at the ends thereof to form recesses 10 (Fig. 4) for receiving the legs of the poultry. It will be observed from Fig. 4 that these reversely-extending end portions lie in a plane substantially at right angles to the vertical plane of the sides 5. In this manner very little space is occupied by the shackle for holding the legs of the poultry as will be observed in Fig. 3. Substantially all of the leg portions 11 of the poultry are left exposed. Accordingly, the garter feathers 12 at a maximum distance from the shackle are accessible to the picking fingers of an automatic picking machine without the fingers striking the shackle.

Inside the open space of the frame of the shackle is provided a resilient shackle member comprising a coil 15 near the top and side members 16 connecting the coil with the bottom portion 7 of the shackle. The lower ends of the side members may be looped around the lower portion 7 forming outwardly-extending loop portions 20, whereby the side members 16 are slidably mounted on the bottom 7. The spring 15 normally urges the sides 16 outwardly whereby the loops 20 close the recesses 10 to hold the legs of the poultry in place. On the inside of the sides 16 of the spring are provided handles 21 which may be gripped by the hand and pressed inwardly when it is desired to open the mouths of the recesses 10 for the reception of the legs of the poultry.

The coil 15 is held in place by a brace which engages the coil and is secured at the extremities to the top 6 and bottom 7 of the shackle. In the embodiment shown in the drawing the brace comprises a wire which is formed into a loop 25 passing over the top 6 and through the coil 15. The two end portions 26 and 27 of the wire extend to the bottom 7. The brace is preferably rigidly secured to the top 6 and to the bottom 7 at approximately the middles, respectively, thereof.

It is to be understood that the invention is not restricted to the exact shape of the portions of the shackle shown in drawing or to the particular kind of materials described. The frame and the spring may vary in shape and construction. For example, instead of the wire, other materials such as a rod, strips, bars, or tubes, etc., may be used. Other types of spring members or other equivalent means may be used for closing the recesses.

Obviously, many modifications and variations of the invention as hereinbefore set forth may be made without departing from the spirit and scope thereof, and therefore only such limitations should be imposed as are indicated in the appended claims.

I claim:

1. A poultry shackle for holding poultry carcasses by the feet in a vertical position comprising: an open frame formed by top and side members lying generally in one plane; a bottom member connecting said side members and having reversely-extending end portions forming leg-receiving recesses lying in a plane substantially at right angles to said frame; and a resilient shackle member operatively connected to the top member of said frame, said shackle member having downwardly-extending side members, the lower ends of which are in slideable engagement with said bottom member and have outwardly-extending portions thereon forming closure members for said leg-receiving recesses.

2. A poultry shackle for holding poultry carcasses by the feet in a vertical position comprising: an open frame formed by top and side members lying generally in one plane; a bottom member connecting said side members and having reversely-extending end portions forming leg-receiving recesses lying in a plane substantially at right angles to said frame; and a resilient shackle member operatively connected to the top member of said frame, said shackle member having downwardly-extending side members, the lower ends of which are in slideable engagement with said bottom member and have outwardly-extending portions thereon, lying in substantially the same plane as said reversely-extending end portions, forming closure members for said leg-receiving recesses.

3. A poultry shackle for holding poultry carcasses by the feet in a vertical position comprising: an open frame formed by top and side members lying generally in one plane; a bottom member connecting said side members and having reversely-extending end portions forming leg-receiving recesses lying in a plane substantially at right angles to said frame; a resilient shackle member disposed within said frame, said shackle member having downwardly-extending side members, the lower ends of which are in slideable engagement with said bottom member and have outwardly-extending portions thereon forming closure members for said leg-receiving recesses; and brace means engaging said shackle member and fixedly positioning the same, said brace means being connected to said top and bottom members of said frame.

DELOS B. VAN DOLAH.

REFERENCES CITED

The following references are of record in the file of this patent:

UNITED STATES PATENTS

| Number | Name | Date |
| --- | --- | --- |
| 1,561,109 | Platt et al. | Nov. 10, 1925 |
| 2,035,948 | DeVout | Mar. 31, 1936 |